United States Patent
Liu et al.

(10) Patent No.: US 9,280,493 B2
(45) Date of Patent: Mar. 8, 2016

(54) METHOD AND DEVICE FOR ENUMERATING INPUT/OUTPUT DEVICES

(71) Applicant: Huawei Technologies Co., Ltd., Shenzhen, Guangdong (CN)

(72) Inventors: Yunhai Liu, Shenzhen (CN); Guanyu Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/141,792

(22) Filed: Dec. 27, 2013

(65) Prior Publication Data
US 2014/0115193 A1    Apr. 24, 2014

Related U.S. Application Data

(63) Continuation of application No. PCT/CN2011/078705, filed on Aug. 22, 2011.

(51) Int. Cl.
*G06F 3/00* (2006.01)
*G06F 13/10* (2006.01)
*G06F 9/44* (2006.01)

(52) U.S. Cl.
CPC .............. *G06F 13/10* (2013.01); *G06F 9/4405* (2013.01); *G06F 9/4411* (2013.01)

(58) Field of Classification Search
None
See application file for complete search history.

(56) References Cited

U.S. PATENT DOCUMENTS

| | | | |
|---|---|---|---|
| 6,732,264 B1 | 5/2004 | Sun et al. | |
| 8,621,481 B2* | 12/2013 | Fu et al. | 718/105 |
| 2003/0093510 A1* | 5/2003 | Cen | 709/223 |
| 2004/0205258 A1* | 10/2004 | Wilson et al. | 710/1 |
| 2004/0268108 A1 | 12/2004 | Chen et al. | |
| 2007/0088943 A1* | 4/2007 | Phelps et al. | 713/2 |
| 2007/0156942 A1* | 7/2007 | Gough | 710/302 |
| 2010/0070969 A1* | 3/2010 | Brockway et al. | 717/176 |
| 2011/0004688 A1* | 1/2011 | Matthews et al. | 709/226 |
| 2011/0010478 A1* | 1/2011 | Zou et al. | 710/302 |

FOREIGN PATENT DOCUMENTS

| | | |
|---|---|---|
| CN | 1592888 A | 3/2005 |
| CN | 1894663 A | 1/2007 |
| CN | 1916849 A | 2/2007 |
| CN | 101609406 A | 12/2009 |

* cited by examiner

*Primary Examiner* — Elias Mamo
(74) *Attorney, Agent, or Firm* — Leydig, Voit & Mayer, Ltd.

(57) ABSTRACT

Embodiments of the present disclosure relate to a method and a device for enumerating input/output devices (IO devices). The method for enumerating input/output devices includes: acquiring an identifier of each processor and an identifier of each input/output (IO) centralized controller in a system; separately instructing processors to simultaneously enumerate a specific IO centralized controller and an input/output IO device connected to the specific IO centralized controller, according to the identifier of each processor and the identifier of each IO centralized controller; and acquiring related information of IO devices enumerated by the instructed processors. According to the embodiments of the present disclosure, the work of enumerating the system IO devices may be allocated to multiple processors to be carried out simultaneously, so as to greatly reduce time consumed in the enumeration process, and to accelerate a system initialization process.

4 Claims, 5 Drawing Sheets

METHOD AND DEVICE FOR ENUMERATING INPUT/OUTPUT DEVICES

CROSS-REFERENCE TO RELATED APPLICATIONS

This application is a continuation of International Patent Application PCT/CN2011/078705, filed on Aug. 22, 2011, which is hereby incorporated by reference in its entirety.

FIELD

Embodiments of the present disclosure relate to hardware system architecture, and in particular, to methods, systems and devices for enumerating input/output devices in a hardware system.

BACKGROUND

Generally, in hardware system architectures such as x86 and Itanium system hardware architectures, a processor, such as a central processing unit (Central Processing Unit, abbreviated as CPU), and an input/output centralized controller (Input/Output Hub or Input/Output Controller Hub, abbreviated as IOH or ICH) are connected to each other through a bus, so as to transmit data. In such hardware system architectures, multiple processors and multiple IOHs may exist at the same time, and each IOH may be connected to multiple input/output (Input/Output, abbreviated as IO or I/O) devices. Multiple bridge devices may be integrated in the IOH, and a bus extending from the bridge device is connected to the processor through a first bus (Bus0) in the system.

Taking x86 and Itanium system hardware architectures for example, a procedure after a system running on hardware system architecture is started is that system firmware (System Firmware) programs fixed in a Flash Read-Only Memory (Flash ROM) run first, where the System Firmware is responsible for configuring and detecting all hardware devices, such as a processor, a memory, and an IO bus, in a server, so as to ensure that the hardware system can work normally, and then the System Firmware is responsible for searching for an operating system loader (Operating System Loader, abbreviated as OS Loader) in a storage device in the system, and invoking the OS Loader to load operating system kernel programs. Although multiple processors (which may be several hundreds in a large server) may exist in the hardware system, when a current System Firmware initializes system IO buses, for example, enumerating IO devices in the system, this work is done merely by one of the processors, and therefore the processor has a special status in the system, i.e. the processor is a system main processor in a Firmware stage. A main reason for that is to keep consistency in allocation of system resources. However, such a process costs much time, and prolongs the time for starting the system, so that a user can't normally use the system until a long time after the system is started, which reduces the satisfaction and product acceptance of the user for the system. In addition, in the product design and development stage, the system is restarted repeatedly to verify whether a modification is valid, and to check the function and performance of the system. If the time for starting the system once is very long, the efficiency for product design and development is reduced, which thereby increases the product cost and reduces the product competitiveness.

SUMMARY

A technical problem intended to be solved in the embodiments of the present disclosure is to improve the efficiency for initializing system IO buses by a system and accelerate a process for enumerating IO devices in the system.

An embodiment of the present disclosure provides a method for enumerating input/output devices, where the method includes:

acquiring an identifier of each processor and an identifier of each input/output IO centralized controller in a system;

separately instructing processors to simultaneously enumerate a specific IO centralized controller and an input/output IO device connected to the specific IO centralized controller, according to the identifier of each processor and the identifier of each IO centralized controller; and acquiring related information of IO devices enumerated by the instructed processors.

An embodiment of the present disclosure provides a device for enumerating input/output devices, where the device includes:

an information collection module, configured to acquire an identifier of each processor and an identifier of each input/output IO centralized controller in a system;

a scheduling module, configured to separately instruct processors to simultaneously enumerate a specific IO centralized controller and an input/output IO device connected to the specific IO centralized controller, according to the identifier of each processor and the identifier of each IO centralized controller; and a result collection module, configured to acquire related information of IO devices enumerated by the instructed processors.

According to the embodiments of the present disclosure, the work of enumerating the system IO devices may be allocated to multiple processors to be carried out simultaneously, so as to greatly reduce time consumed in the enumeration process, and accelerate a system initialization process.

BRIEF DESCRIPTION OF THE DRAWINGS

To illustrate the technical solutions according to the embodiments of the present disclosure more clearly, accompanying drawings to be used for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The technical solutions according to the embodiments of the present disclosure will be clearly described below with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

The term "hardware system architecture" refers to a system architecture including hardware components such as a processor, and an input/output centralized controller, for example, common x86 and Itanium system hardware architecture, and the hardware system architecture mainly refers to an ordinary personal computer, server and so on. The hardware system architecture may include a node and each node has a processor socket (Socket), and an input/output centralized controller. The hardware system architecture may be a personal computer or server including only one node, or a large server including more nodes. One node may have only one processor Socket, or more than one processor Sockets, as long as the x86 and Itanium architecture specifications are met. Another possible variation is that the processor and the input/output centralized controller are integrated into one Socket, or multiple input/output centralized controllers are integrated into one chip Socket. For ease of management, each processor and each input/output centralized controller in the hardware system architecture have a serial number different from each other, and the serial number may be determined in hardware design or designated by software programming. Different platforms may employ different methods, and software running in the system may read the serial number through an internal system bus, or read the serial number through a system management bus (System Management Bus, abbreviated as SMBus). Different systems may employ different designs and the method for setting and reading the serial number is not limited in the present disclosure. Although the description is made herein with x86 and Itanium platforms as an example, the embodiments of the present disclosure are not merely applicable to the x86 and Itanium platforms, but applicable to any hardware system architecture having a similar logic mechanism.

In the large server including more nodes, connection manners between nodes may be different in different systems, for example, the nodes may be directly connected by a dedicated high-speed interconnect interface (for example, QuickPath Interconnect interface, abbreviated as QPI) directly owned by the processor. The interconnect manner between nodes and the used protocol type are not limited in the present disclosure.

The system management bus is a kind of out-of-band bus. The out-of-band bus refers to a bus other than the internal system bus. The internal system bus is an in-band bus, and refers to a high-speed and high-bandwidth bus which connects function modules of the processor, the memory, and the IO device into a system, and is used to perform main functions of the system. The out-of-band bus is generally low in speed and bandwidth, and is generally used for system management.

The term "system firmware" refers to software that is fixed in a Flash ROM and used to, after the system is powered on, configure system hardware devices including their registers and allocate resources to the system hardware devices. In all systems, a variety of system firmware exists. In the x86 and Itanium systems, a more common name of the system firmware is basic input/output system (Basic Input/Output System, abbreviated as BIOS), and the BIOS here refers to a legacy (Legacy) BIOS widely used at present, and a new generation of BIOS that is gradually prevalent at present, i.e. a unified extensible firmware interface BIOS (Unified Extensible Firmware Interface BIOS, abbreviated as UEFI BIOS). For further generalization, the name of system firmware is used uniformly herein.

The term "IO centralized controller" refers to an IO chip, IO device centralized mount point, IO switch, IO Bridge Chip, IO Switch, IO Hub, I/O Controller Hub, IO Router or another module/chip having similar functions, in which one or more IO bridges are integrated, one or more IO endpoint devices are integrated, or one or more IO bridge devices and endpoint devices are both integrated.

Figure 1:
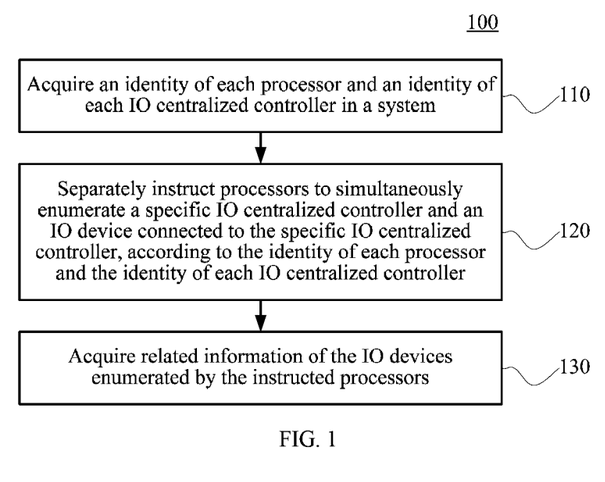
FIG. 1 is a flow chart of a method according to an embodiment of the present disclosure.

FIG. 1 is a flow chart of a method for enumerating system IO buses according to an embodiment of the present disclosure. As shown in FIG. 1, a method 100 includes:

110: Acquire an identifier of each processor and an identifier of each IO centralized controller in a system.

120: Separately instruct the processors to simultaneously enumerate a specific IO centralized controller and an IO device connected to the specific IO centralized controller, according to the identifier of each processor and the identifier of each IO centralized controller.

130: Acquire related information of the IO devices enumerated by the instructed processors.

The method according to the embodiment of the present disclosure is described in detail below with reference to solutions in specific embodiments.

Embodiment 1

Figure 2:
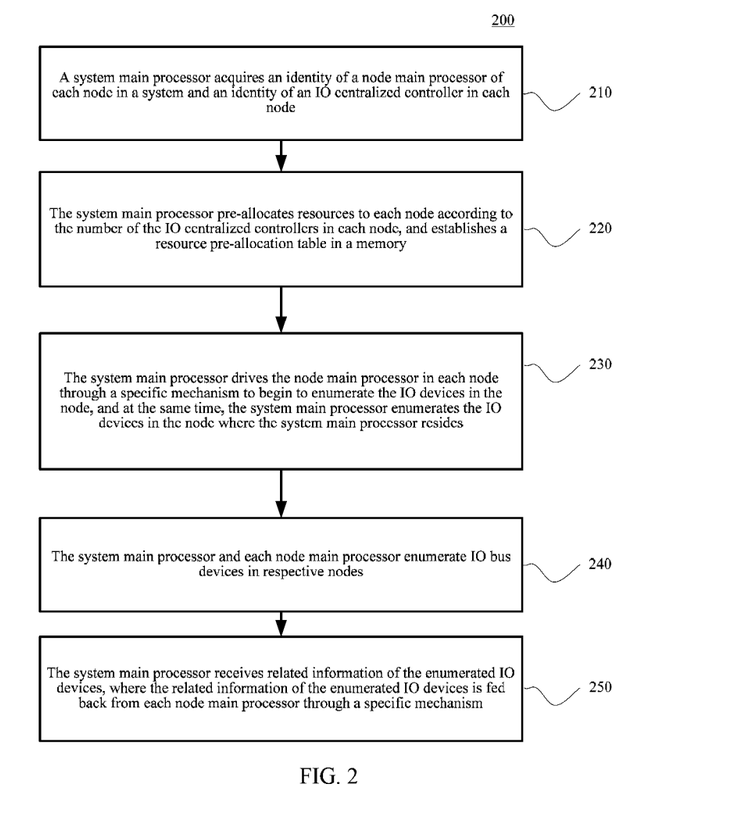
FIG. 2 is a flow chart of Embodiment 1 of the present disclosure.

FIG. 2 is a flow chart of a method 200 for enumerating IO devices in a system according to Embodiment 1 of the present disclosure. The method 200 according to Embodiment 1 is applicable to hardware system architectures in which multiple nodes exist. As described above, each node has a node main processor for processing a node-level transaction in the node. In addition, a processor referred to as system main processor also exists in the system, and as a processor of the highest level in the system, is responsible for a system-level transaction, and is also a node main processor of a node where the system main processor resides. It should be noted that, the system main processor and the node main processor are automatically selected by the system through a certain mechanism. For example, it may be specified that a processor with a certain serial number automatically becomes a system main processor or a node main processor, or other software (for example, system management software) independent of the host system designates which processor becomes a system main processor and which processors separately become node main processors. This mechanism may be different on different platforms, and is not limited in the embodiment of the present disclosure. The system main processor and the node main processor are only a logical concept, and not physically special processors.

As shown in FIG. 2, the method 200 includes:

210: A system main processor acquires an identifier of a node main processor of each node in a system and an identifier of an IO centralized controller in each node. It should be understood that the system main processor may also acquire an identifier of the system main processor at the same time. According to the embodiment of the present disclosure, the system main processor may further acquire other related information of the IO centralized controller at the same time, for example, the number of the IO centralized controllers. Here, the acquiring the identifier of the processor and the identifier of the IO centralized controller includes but is not limited to acquiring a serial number of the processor and a serial number of the IO centralized controller. Here, for acquiring other related information identifier of the IO centralized controller, different methods may be used for different systems, for example, collecting the number of IO centralized controllers in each node according to a hardware signal, because the greater the number of the IO centralized controllers, the more IO buses and IO devices there are, and the more resources are required. If supported by the hardware system architecture, another method through which more detailed information may be supported is running, in the system, management software independent of the host system, where the management software may access a register in each chip through a certain physical channel such as a system management bus. Not only can each IO device be found, but also an IO sub-device (including a bridge device) integrated in each IO device may also be found, and thereby quite detailed information is collected. The method for collecting the identifier of the processor and the identifier of the IO centralized controller and the related information is not limited in the embodiment of the present disclosure. The identifier of each node main processor and the identifier of the IO centralized controller in each node, which are acquired by the system main processor, may be stored in a system memory, and the system memory may be accessed by each processor.

220: The system main processor pre-allocates resources to each node according to the number of the IO centralized controllers or the number of the IO devices in each node, and establishes a resource pre-allocation table in the memory.

According to an embodiment of the present disclosure, the enumeration process may be accelerated by simultaneously enumerating, by multiple processors, the IO devices in the system. In order to keep consistency in allocation of all the system resources, it is required to pre-allocate resources to each node in advance, so as to prevent resource conflict. In the method for pre-allocating resources here, for example, performing sorting according to the number of the IO centralized controllers in each node, the greater the number of the IO centralized controllers, the larger the scale of the IO device is deemed to be, and the more resources are required. The method for pre-allocating resources is not limited in the present disclosure. Those of skill in the art may correspondingly select a suitable method to pre-allocate resources to each node according to requirements, with the aim of ensuring that the resource allocation among nodes is balanced and no resource conflict occurs for the IO devices in each node. A resource pre-allocation table established in the memory is, for example, shown in Table 1.

TABLE 1

Resource pre-allocation table

| | Node 0 | Node 1 | Node 2 | Node 3 |
|---|---|---|---|---|
| Resource item 1 | Initial value-number | Initial value-number | Initial value-number | Initial value-number |
| Resource item 2 | Initial value-number | Initial value-number | Initial value-number | Initial value-number |
| ... | ... | ... | ... | ... |

The resource item here includes, for example, a memory space address, an IO space address, a bus serial number and so on. It should be noted that the resource item may be another type different from those listed above, and the types and number of the resource items are not limited in the present disclosure.

230: The system main processor drives the node main processor in each node through a specific mechanism to begin to enumerate the IO devices in the present node, and at the same time, the system main processor enumerates the IO devices in the node where the system main processor resides. The mechanism may be different on different hardware platforms, for example, on an x86 platform, the system main processor may drive other processors (for example, the node main processors) to complete a specified task through a method in which a programming interrupt controller sends an "inter-processor interrupt signal"; or tasks and data are transferred between the system main processor and each node main processor through a memory sharing method set by the system. For example, a memory sharing method is to set, in the system memory, an instruction area used to store instruction information, wherein the instruction is used to drive an instructed processor, for example, the node main processor in each node, to simultaneously enumerate the IO centralized controller and the IO device connected to the IO centralized controller in the node. A specific mechanism for driving the node main processor by the system main processor is not limited in the embodiment of the present disclosure. As the resource pre-allocation table is established in the system memory, and each processor in the system, including the system main processor and the node main processor, can access the system memory, each node main processor can acquire the resource pre-allocation table.

Figure 3:
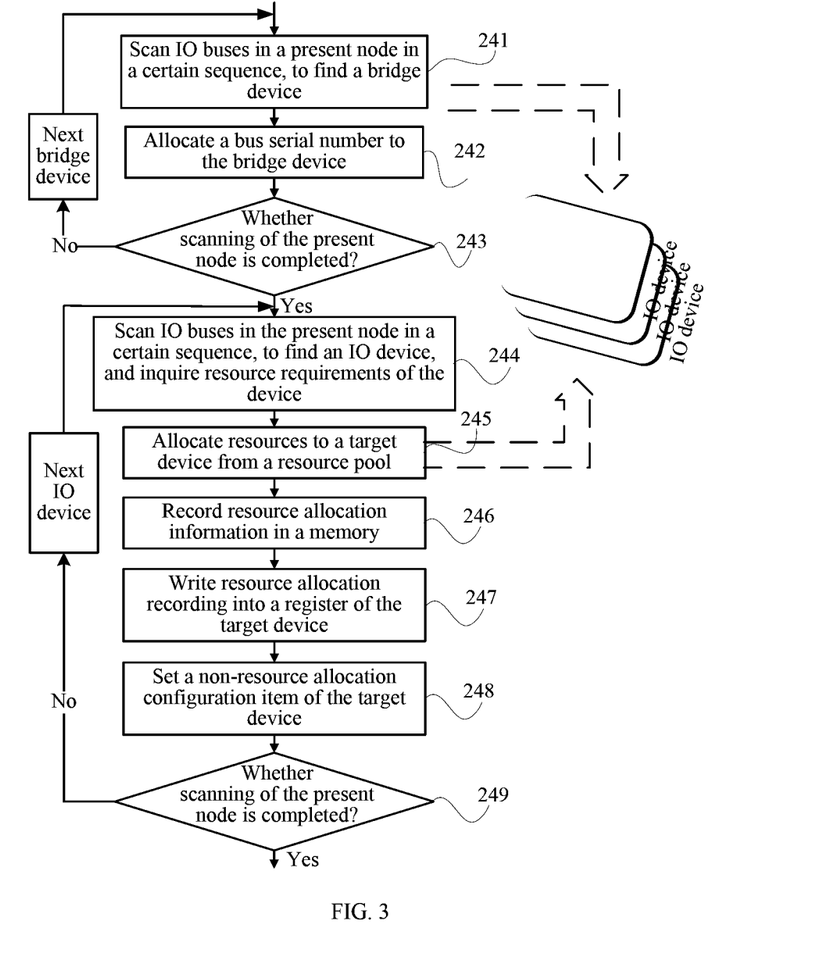
FIG. 3 is a flow chart for enumerating IO devices in each node according to Embodiment 1 of the present disclosure.

240: The system main processor and each node main processor enumerate the IO bus devices in respective nodes. A process for enumerating the IO devices in respective nodes is, for example, as shown in FIG. 3. Step 240 for enumerating the IO devices in each node includes:

241: Scan IO buses in a present node according to a certain sequence, to find a bridge device.

242: Allocate a bus serial number to the bridge device.

243: Determine whether scanning of the bridge devices in the present node is completed.

244: Scan IO buses in the present node according to a certain sequence, to find an IO device, and inquire resource requirements of the IO device.

245: Allocate resources to the IO device according to the resources pre-allocated to the present node in the resource pre-allocation table.

246: Record resource allocation information in the system memory, for example, in an enumeration result area of the system memory.

247: Write a resource allocation record into a register of the IO device.

248: Optionally, set a non-resource allocation configuration item of the IO device.

249: Determine whether scanning of the IO devices in the present node is completed.

After all the node main processors complete the scanning of the IO devices in respective nodes, the method 200 includes:

250: The system main processor receives related information of the enumerated IO devices, where the related information of the enumerated IO devices is fed back from each node main processor through a specific mechanism, for example, the identifiers of the IO devices in each node are fed back to the system main processor. The related information here includes, for example, a type, an identifier, resource allocation (for example, starting address of the memory and size of the memory area), a bus serial number, and a device serial number of the enumerated IO device. The feedback mechanism here may be different for different hardware system architectures, for example, results are transferred between processors through a method of sharing a memory by the system main processor and the node main processors. For example, a memory sharing method is to set, in the system memory, an enumeration result area used to store related information of the enumerated IO devices, so that the system main processor acquires related information of IO devices enumerated by a designated processor, for example, the node main processor in each node. The feedback mechanism is not limited in the present disclosure.

Embodiment 1 of the present disclosure is especially applicable to a large system and the grouping method is simple and effective, since a general large system is formed of multiple nodes. An advantage of Embodiment 1 lies in that the task for enumerating the IO devices is allocated to all the nodes to be carried out in parallel simultaneously, so that the time is reduced to 1/N of that in the prior art, wherein N is the number of the nodes in the system.

Embodiment 2

Figure 4:
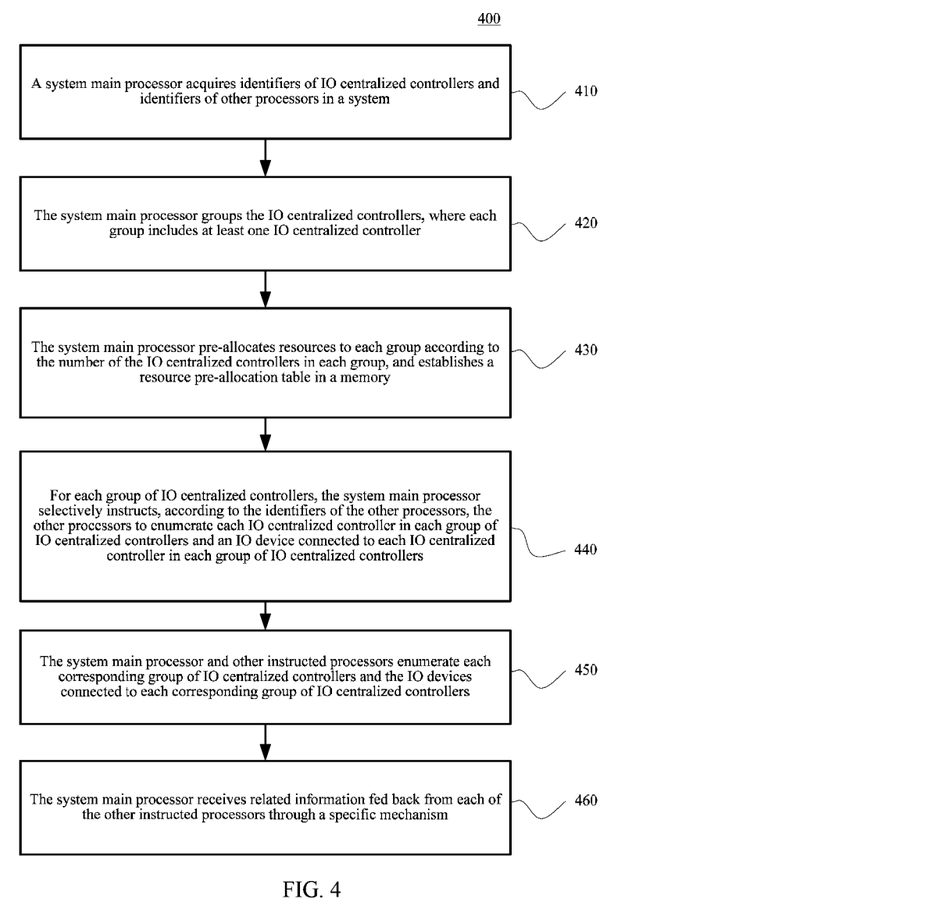
FIG. 4 is a flow chart of Embodiment 2 of the present disclosure.

A difference between Embodiment 2 and Embodiment 1 of the present disclosure is that in Embodiment 2, there is no definite node concept in the hardware system architecture, for example, there is only one node in the hardware system architecture. In such hardware system architectures, the flexibility for grouping of the IO centralized controllers and for selecting of processors for enumerating each group of IO centralized controllers and IO devices connected to each group of IO centralized controllers is greater. FIG. 4 is a flow chart of a method 400 for enumerating IO devices according to Embodiment 2 of the present disclosure. As specifically illustrated below, the method 400 includes:

410: A system main processor acquires identifiers of IO centralized controllers and identifiers of other processors in a system. The system main processor may also acquire its own identifier. Similar to Embodiment 1, the system main processor may also acquire information of the number of the IO centralized controllers.

420: According to a specific situation, the system main processor groups the IO centralized controllers, where each group includes at least one IO centralized controller. For example, the IO centralized controllers may be grouped according to the identifier of the IO centralized controller. Alternatively, a specific processor participating in enumerating the IO devices may be selected first, and then the IO centralized controller connected to the specific processor is arranged into one group.

430: The system main processor pre-allocates resources to each group according to the number of the IO centralized controllers in each group, and establishes a resource pre-allocation table in a memory. A method for pre-allocating resources to each group of IO centralized controllers and the resource pre-allocation table established in the memory are similar to those in Embodiment 1, except that the group replaces the node here.

440: For each group of IO centralized controllers, the system main processor selectively instructs, according to identifiers of other processors, the other processors to enumerate each IO centralized controller in each group of IO centralized controllers and an IO device connected to each IO centralized controller in each group of IO centralized controllers. In the embodiment, one processor is designated for each group of IO centralized controllers to enumerate the IO device. According to the embodiment of the present disclosure, the system main processor is also configured to enumerate one group of IO centralized controllers, for example, a group of IO centralized controllers connected to the system main processor.

450: The system main processor and the other instructed processors enumerate each corresponding group of IO centralized controllers and the IO devices connected to each corresponding group of IO centralized controllers. Specific enumeration steps are similar to steps 241 to 249 in Embodiment 1, and are not described in detail again.

460: The system main processor receives related information fed back from each of the other instructed processors through a specific mechanism, for example, identifiers and resource allocation information of the IO devices of each group of IO centralized controllers are fed back to the system main processor. The feedback mechanism may be different for different hardware system architectures, for example, as described in Embodiment 1, related information may be transferred between processors through a method of sharing a memory by the system main processor and each of the instructed processors. The feedback mechanism is not limited in the present disclosure.

According to the embodiment of the present disclosure, the work of enumerating the system IO devices may be allocated to multiple processors to be carried out simultaneously, so as to greatly reduce time consumed in the enumeration process, and accelerate a system initialization process.

Figure 5:
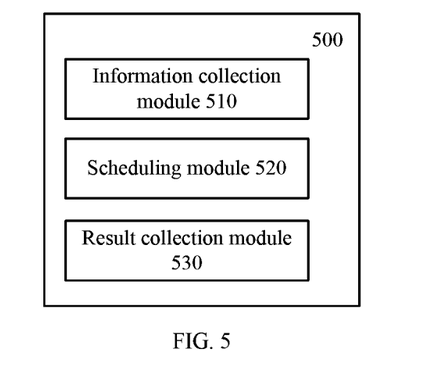
FIG. 5 is a schematic structural diagram of a device according to an embodiment of the present disclosure.

FIG. 5 is a schematic structural diagram of a device 500 for implementing a method for enumerating IO devices in a system according to an embodiment of the present disclosure. As shown in FIG. 5, the device 500 includes:

an information collection module 510, configured to acquire an identifier of each processor and an identifier of each IO centralized controller in a system;

a scheduling module 520, configured to separately instruct the processors to simultaneously enumerate a specific IO centralized controller and an IO device connected to the specific IO centralized controller, according to the identifier of each processor and the identifier of each IO centralized controller; and a result collection module 530, configured to acquire related information of the IO devices enumerated by the instructed processors.

Figure 6:
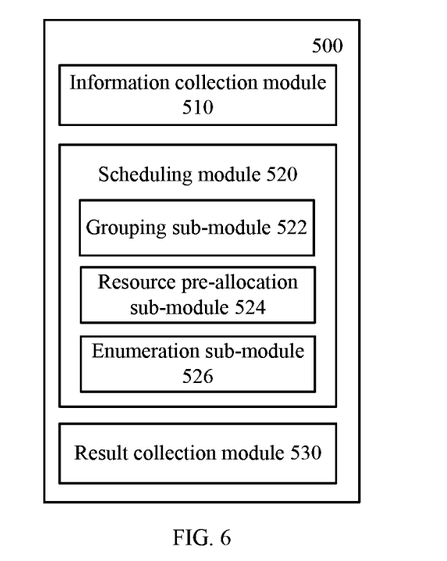
FIG. 6 is a further detailed schematic structural diagram of a device according to an embodiment of the present disclosure.

As shown in FIG. 6, according to the embodiment of the present disclosure, the scheduling module 520 further includes:

a grouping sub-module 522, configured to arrange the IO centralized controllers into multiple groups according to the identifiers of the IO centralized controllers, where each group includes at least one IO centralized controller;

a resource pre-allocation sub-module 524, configured to pre-allocate resources to each group of IO centralized controllers according to the number of the IO centralized controllers in each group, and establish a resource pre-allocation table in a system memory;

an enumeration sub-module 526, configured to, for each group of IO centralized controllers, separately instruct the processors to enumerate each IO centralized controller in each group of IO centralized controllers and IO devices connected to each IO centralized controller in each group of IO centralized controllers, according to the identifier of each processor.

According to an embodiment of the present disclosure, the grouping sub-module 522 is configured to arrange the IO centralized controllers to which each node belongs in the system into one group, and the enumeration sub-module 526 is configured to instruct a system main processor to enumerate the IO centralized controllers in a node, where the system main processor resides, and the IO devices connected to the IO centralized controllers in the node, and instruct a node main processor in each node to enumerate the IO centralized controllers to which the node belongs and the IO devices connected to the IO centralized controllers to which the node belongs.

According to an embodiment of the present disclosure, the enumeration sub-module 526 is configured to separately instruct the processors to scan, in a certain sequence, each group of IO centralized controllers and the IO devices connected to each group of IO centralized controllers, and when the IO device is found, allocate resources to the IO device according to resources pre-allocated to each group of IO centralized controllers, record resource allocation information in the system memory, write a resource allocation record into a register of the IO device, and set a non-resource allocation configuration item of the IO device.

According to an embodiment of the present disclosure, the information collection module 510 acquires the identifier of each processor and the identifier of each IO centralized controller according to a hardware signal in the system, or acquires the identifier of each processor and the identifier of each IO centralized controller by accessing a system management bus, or acquires, in cooperation with system management software, the identifier of each processor and the identifier of each IO centralized controller.

According to an embodiment of the present disclosure, the information collection module 510 is further configured to store the identifier of each processor and the identifier of each IO centralized controller in the system memory, where the system memory may be accessed by each of the processors.

According to an embodiment of the present disclosure, the scheduling module 520 is configured to set, in the system memory, an instruction area used to store instruction information, where the instruction is used to drive the instructed processors to simultaneously enumerate each group of IO centralized controllers and the IO devices connected to each group of IO centralized controllers.

According to an embodiment of the present disclosure, the result collection module 530 is configured to set, in the system memory, an enumeration result area used to store related information of the enumerated IO devices, so that the system main processor acquires related information of the IO devices enumerated by the instructed processors.

Persons of ordinary skill in the art can be aware that a combination of exemplary units and algorithm steps described in embodiments disclosed herein may be implemented by electronic hardware, computer software, or a combination of electronic hardware and computer software. Whether these functions are executed in a manner of hardware or software depends upon a particular application and design constraint conditions of the technical solution. Persons skilled in the art may use different methods to implement the described functions for each particular application, but it should not be deemed that the implementation goes beyond the scope of the present disclosure.

Persons skilled in the art can clearly understand that, for the purpose of convenient and brief description, for a detailed working process of the foregoing system, device and unit, reference may be made to the corresponding process in the foregoing method embodiments, and the details will not be described herein again.

In the several embodiments provided in this application, it should be understood that the disclosed system, device, and method may be implemented in other manners. For example, the described device embodiments are merely exemplary. For example, the unit division is merely logical function division and there may be other division manners in actual implementations. For example, multiple units or components may be combined, or may be integrated into another system, or some features can be ignored or not performed. Furthermore, the shown or discussed coupling or direct coupling or communication connection may be accomplished through some interfaces, and indirect coupling or communication connection between devices or units may be electrical, mechanical, or in other forms.

Units described as separate components may be or may not be physically separated. Components shown as units may be or may not be physical units, that is, may be located in one place or may be distributed to a plurality of network units. Part or all of the modules may be selected to achieve the objective of the solution in the embodiment according to actual requirements.

In addition, functional units in each embodiment of the present disclosure may be integrated in one processing module or each unit may exist physically separately, or two or more units may also be integrated in one unit.

If the functions are implemented in a form of a software functional unit and sold or used as a independent product, the functions may be stored in a computer readable storage medium. Based on such understanding, the essence of the technical solution of the present disclosure, that is, the part that makes contributions to the prior art, or part of the technical solution may be embodied in a form of a software product. The computer software product may be stored in a storage medium, and include several instructions for making a computer device (for example, a personal computer, a server, or a network device) perform all or part of the steps of the methods described in the embodiments of the present disclosure. The storage medium includes various non-transitory media capable of storing program codes, such as a flash disk, a mobile hard disk, a Read-Only Memory (ROM, Read-Only Memory), a Random Access Memory (RAM, Random Access Memory), a magnetic disk or an optical disk.

What is described above is merely specific implementation manners of the present disclosure, but does not limit the protection scope of the present disclosure. Variations and modifications that can be easily figured out by persons skilled in the art within the technical scope disclosed in the present disclosure shall all fall within the protection scope of the present disclosure. Therefore, the protection scope of the present disclosure is subject to the appended claims.

What is claimed is:

1. A method for enumerating input/output (IO) devices in a computer system, wherein the computer system comprises a plurality of nodes and a system main processor, each of the nodes includes a node main processor and an IO centralized controller connected to an IO device, wherein the system main processor is one of the node main processors, and wherein the method comprises:
   instructing, by the system main processor, the node main processor in each node to simultaneously enumerate the IO centralized controller and the IO device connected to the IO centralized controller;
   acquiring, by the system main processor, information of IO devices enumerated by the node main processors;
   pre-allocating, by the system main processor, resources to each node;
   establishing, by the system main processor, a resource pre-allocation table in a computer system memory; and
   allocating, by the system main processor, resources to each node according to the resource pre-allocation table, wherein: the allocating resources to each node according to the resource pre-allocation table comprises:
   instructing each node main processor to scan the IO centralized controller and the IO device connected to the IO centralized controller in each node, and when the IO device is found:
allocating resources to the IO device according to the resource pre-allocation table,
recording resource allocation information in the computer system memory,
writing a resource allocation record into a register of the IO device, and
setting a non-resource allocation configuration item of the IO device.

2. A method for enumerating input/output (IO) devices in a computer system, wherein the computer system comprises a plurality of processors and a plurality of IO centralized controllers, each IO centralized controller being connected to an IO device, wherein one of the processors is a system main processor, and wherein the method comprises:
arranging, by the system main processor, the IO centralized controllers into multiple groups;
for each group of the IO centralized controllers, instructing, by the system main processor, a designated processor from the processors to simultaneously enumerate each IO centralized controller and the IO device connected to each IO centralized controller;
acquiring, by the system main processor, information of IO devices enumerated by the designated processors;
pre-allocating resources to each group of IO centralized controllers according to the number of the IO centralized controllers in each group;
establishing a resource pre-allocation table in a computer system memory; and
allocating resources to the enumerated IO devices according to the resources pre-allocated to each group of IO centralized controllers, wherein: the allocating resources to the enumerated IO devices according to the resources pre-allocated to each group of IO centralized controllers comprises:
for each group of the IO centralized controllers, instructing the designated processor to scan each IO centralized controller and the IO device connected to each IO centralized controller; and
when the IO device is found:
allocating resources to the IO device according to resources pre-allocated to each group of IO centralized controllers,
recording resource allocation information in the computer system memory,
writing a resource allocation record into a register of the IO device, and
setting a non-resource allocation configuration item of the IO device.

3. A non-transitory computer readable storage medium, comprising instructions which, when executed in a computer system, wherein the computer system comprises a plurality of nodes and a system main processor, each of the nodes includes a node main processor and an IO centralized controller connected to an IO device, and the system main processor is one of node main processors, cause the computer system to carry out steps of:
instructing, by the system main processor, the node main processor in each node to simultaneously enumerate the IO centralized controller and the IO device connected to the IO centralized controller;
acquiring, by the system main processor, information of IO devices enumerated by the node main processors;
pre-allocating, by the system main processor, resources to each node;
establishing, by the system main processor, a resource pre-allocation table in a computer system memory; and
allocating, by the system main processor, resources to each node according to the resource pre-allocation table, wherein: the allocating resources to each node according to the resource pre-allocation table comprises:
instructing each node main processor to scan the IO centralized controller and the IO device connected to the IO centralized controller in each node, and
when the IO device is found:
allocating resources to the IO device according to the resource pre-allocation table,
recording resource allocation information in the computer system memory,
writing a resource allocation record into a register of the IO device, and
setting a non-resource allocation configuration item of the IO device.

4. A non-transitory computer readable storage medium, comprising instructions which, when executed in a computer system, wherein the computer system comprises a plurality of processors and a plurality of IO centralized controllers, each IO centralized controller being connected to an IO device, one of the processors being a system main processor, cause the computer system to carry out steps of:
arranging, by the system main processor, the IO centralized controllers into multiple groups;
for each group of the IO centralized controllers, instructing, by the system main processor, a designated processor from the processors to simultaneously enumerate each IO centralized controller and the IO device connected to each IO centralized controller;
acquiring, by the system main processor, information of the IO devices enumerated by the designated processors;
pre-allocating, by the system main processor, resources to each node;
establishing, by the system main processor, a resource pre-allocation table in a computer system memory; and
allocating, by the system main processor, resources to each node according to the resource pre-allocation table, wherein the allocating resources to the enumerated IO device according to the resources pre-allocated to each group of IO centralized controllers comprises:
for each group of the IO centralized controllers, instructing the designated processor to scan each IO centralized controller and the IO device connected to each IO centralized controller; and
when the IO device is found:
allocating resources to the IO device according to resources pre-allocated to each group of IO centralized controllers,
recording resource allocation information in the computer system memory,
writing a resource allocation record into a register of the IO device, and
setting a non-resource allocation configuration item of the IO device.

* * * * *